May 22, 1956
R. G. AYENSA
2,746,059
VALVES FOR WATERCLOSET TANKS AND
MECHANISM FOR OPERATING SAME
Filed Dec. 9, 1954
2 Sheets-Sheet 1
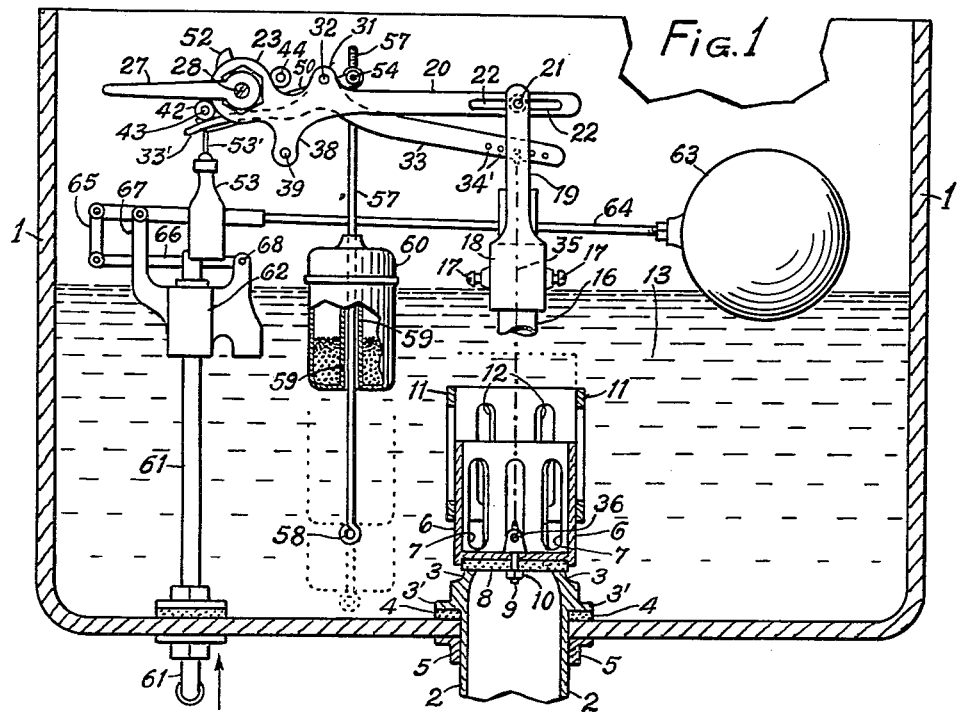
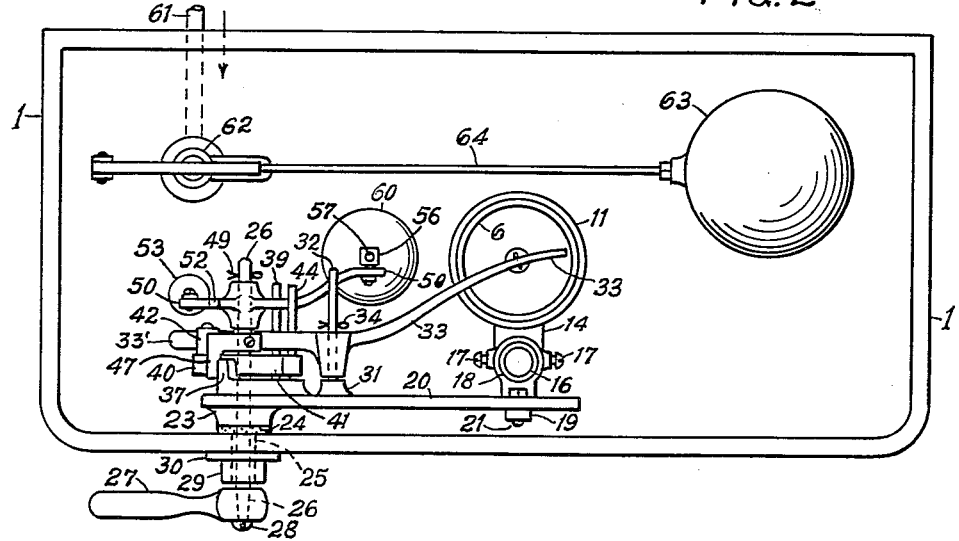
INVENTOR:
Robustiano Gascon Ayensa,
BY Singer, Stern & Carlberg
ATTORNEYS.

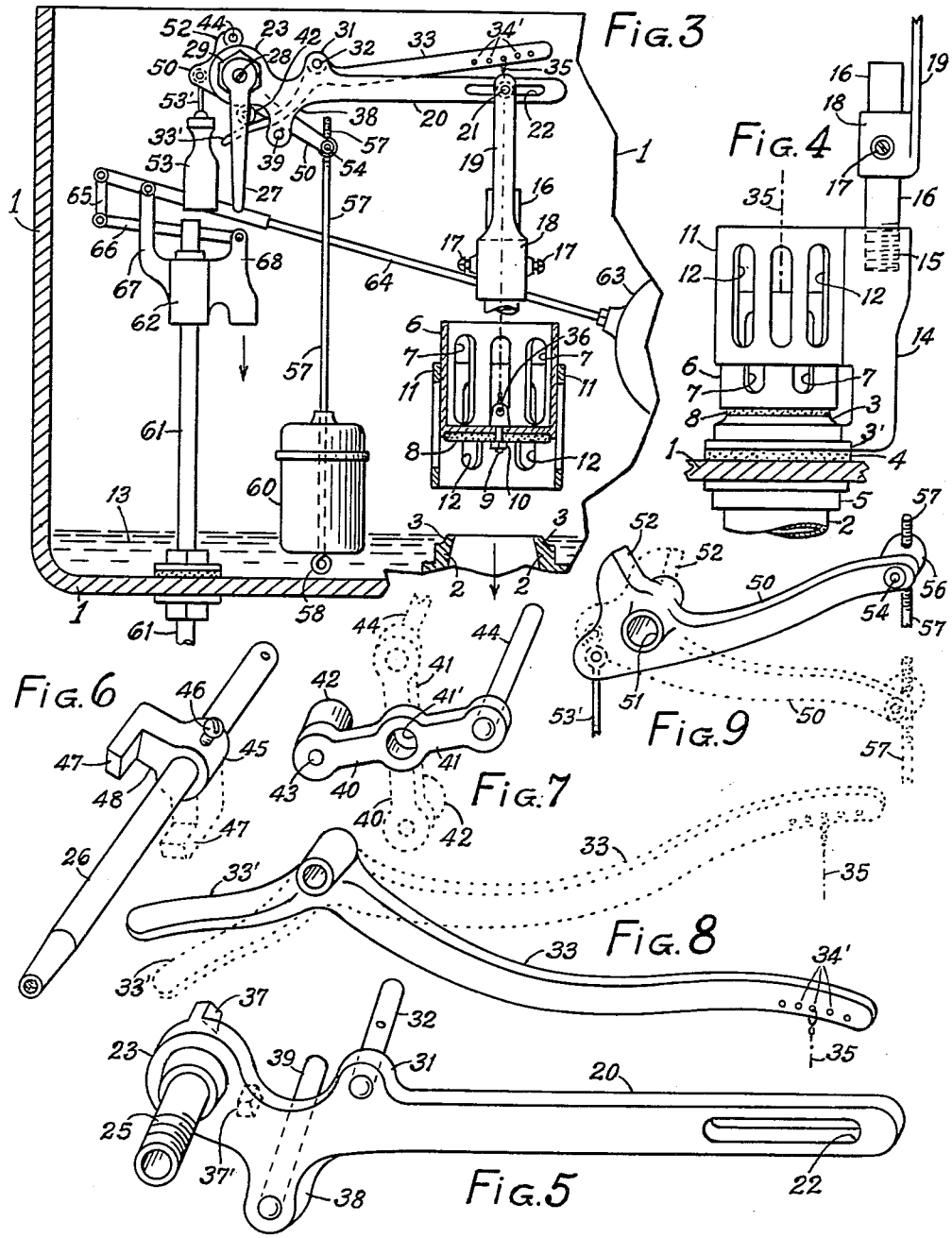

United States Patent Office 2,746,059
Patented May 22, 1956

2,746,059

VALVES FOR WATERCLOSET TANKS AND MECHANISM FOR OPERATING SAME

Robustiano Gascon Ayensa, Havana, Cuba

Application December 9, 1954, Serial No. 474,241

3 Claims. (Cl. 4—53)

This invention relates to discharge valves for watercloset tanks and to the mechanism for operating same, and it has for its object to provide a heavy valve which upon falling obturates the dishcarge opening of the water tank to effectively prevent water leakage, and a mechanism for operating same which is so constructed that upon operating the outer handle it is rendered unnecessary to keep the latter pressed down until after the discharge of the tank water is completed, but said handle will only function to start the mechanism movement, the valve being held raised a period of time sufficient to allow almost all the tank water to be discharged. Said mechanism cooperates with a counterbalanced float which follows the lowering of the level of the water in the tank and as said float rests upon the tank bottom once the whole water is discharged, it will actuate a stop which will release the catch that held the valve in raised position, whereupon the valve will fall and obturate the discharge tube for the tank water at a time when the conventional watercloset tank float actuates the water supply valve to thereby allow refilling of the tank. The catch and release mechanism for the valve comprises a first stop secured to the horizontal shaft of the operating handle, a second stop having two opposed arms and being loosely mounted like a swing-bar on the same shaft and through which the firstly mentioned stop actuates upon the secondly mentioned stop and the latter actuates upon the lever wherefrom the valve depends, the two-opposite-branch stop having two limit positions at a 90° angle respectively to one another which are determined by two catch teeth on the support for the handle shaft, and a second lever having a stop gripper and wherefrom said float depends, and being loosely mounted on the handle shaft behind the secondly mentioned stop. In this manner the described mechanism for operating the valve is apt to operate effectively and free from displacements that would prevent the valve from seating steadily, which is the usual cause for repeated alterations requiring continuous repairs of the watercloset tanks at present in use.

The invention is described with reference to the figures of the accompanying drawings, of which:

Fig. 1 is a longitudinal vertical sectional view of an uncovered watercloset tank provided with the valve and the mechanism for operating same that are the object of this invention, in the closed position of the valve.

Fig. 2 is a top plan view of the same tank and mechanism.

Fig. 3 is a fragmentary longitudinal vertical sectional view of the same watercloset tank, showing the valve in its raised position as held by operation of the outer handle.

Fig. 4 is an outer elevational detailed view of the stand supporting the valve seat base and an apertured sleeve serving as a guide for the valve in its vertical movement.

Fig. 5 is a perspective detailed view showing the horizontal support bar adjustably mounted on the top end of a vertical bar mounted on the stand of Fig. 4 and carrying the journal bearing for the horizontal shaft of the operating handle and wherefrom a pivot pin projects backwards to serve as a support for the lever from which the valve depends.

Fig. 6 is a perspective detailed view of the horizontal shaft to the outer end of which the operating handle is secured and which carries a stop piece formed by an axle-box and a stop tooth.

Fig. 7 is a perspective detailed view showing the stop piece having two opposed arms of which one arm carries a loose roller and the other arm carries a long pin serving as a stop.

Fig. 8 is a perspective detailed view showing the lever wherefrom a valve chain depends and which is pivotally mounted on the long pin of Fig. 5.

Fig. 9 is a perspective detailed view of the lever pivotally mounted on the handle shaft and wherefrom depends a vertical rod on which is slidably mounted a counterbalanced float determining the fall of the valve when the gripper carried on top by said lever abuts the long pin of Fig. 7.

In Figs. 1, 2 and 3 of the drawings, 1 indicates a watercloset tank unprovided with its cover and having at its bottom an opening through which is mounted the discharge tube 2 having a top seat rim 3 and an annular flange 3' tightening a packing washer 4 above the bottom of tank 1, the tube 2 being secured by a thread wing 5 threaded on the tube beneath the bottom of tank 1 and tightening against the latter. The rim 3 of the annular flange 3' forms the seat base for a metallic valve of hollow cylindrical shape 6 closed at the bottom and open on top and which is provided with large openings 7 at its peripheral wall and rests on the rim 3 through a packing disc 8 secured to the bottom of valve 6 by a bolt 9 and a nut 10. Said valve 6 is adapted to move up and down through a sleeve 11 within which it fits and which is also provided with large openings 12 to allow the passage of water 13 from the tank into the valve 6 and which sleeve is integral with a stand 14 integral with the rim 3 of tube 2. The stand 14 has a top hollow portion provided with threads 15 to threadedly receive a vertical tubular bar 16 on the top portion of which is adjustably and slidably mounted through pressure screws 17 the sleeve 18 which terminates in a plane vertical bar 19 adjustably supporting a plane horizontal supporting bar 20 by a horizontal screw 21 passing across a horizontal slot 22 in said bar 20 at one end thereof. The bar 20 has formed at its other end a journal bearing 23 holding a packing 24 against the inner face of the fore wall of the tank 1 and carrying an externally threaded horizontal axle-box 25 extending through a hole in the fore wall of the tank 1. A horizontal shaft 26 is rotatably mounted in the axle-box 25 and fixedly carries at its outer frusto-conical end the handle 27 which is secured by a screw 28 screwed in a threaded hole of the shaft 26. The axle-box 25 is tightened against the outer face of the fore wall of the tank 1 by a nut 29 and a washer 30 which are placed in position prior to the handle 27.

The supporting bar 20 has at its rear face adjacent the journal bearing 23 a protuberance 31 from which projects backwards a long horizontal pin 32 serving as a pivot shaft for a lever 33 held by a cotter pin 34 and having a horizontally flattened arm 33' extending transversely of the shaft 26 and beneath same, and the other vertically flattened arm of the lever 33 is provided with a plurality of horizontal holes 34' for the adjustable engagement of the end ring of a chain 35 fastened at its lower end to the eye of a lug 36 projecting upwardly from the bottom of valve 6. The supporting bar 20 is also provided with an upper stop tooth 37 and a lower stop tooth 37' at its end carrying the journal bearing 23 and from the portion of bar 20 that extends between the journal bearing 23 and the pin 32 downwardly projects an extension 38 carrying a long stop pin 39 projecting backwards and parallel to the pin 32.

Between the flattened arm 33' of lever 33 and the journal bearing 23 there is pivotally mounted on the shaft 26 a stop piece having two opposed arms 40 and 41 having a central enlargement provided with an opening 41' through which the shaft 26 passes. Said stop piece has at its end corresponding to the arm 40 a roller 42 loosely mounted on a horizontal pin 43, and its other end corresponding to the arm 41 has a fixed long pin 44 serving as a stop as will be presently explained. The roller 42 remains above the flattened arm 33' of lever 33, and above the arm 40 of the two-opposed arm piece an axle-box 45 is secured to the shaft 26 by a pressure screw 46, said axle-box 45 having a tooth 47 horizontally projecting onwards at a right angle from an arm 48 secured to the axle-box.

On the rear end of the shaft 26 is pivotally mounted and locked by a cotter pin 49 a short lever 50 provided at one end with an opening 51 through which it mounts on the shaft 26 and a raised gripper 52 above the opening 51 which serves as a stop as will be presently explained, a weight 53 depending from the short arm of the lever 50 through a cable 53', while the end of the longer arm of the lever 50 has rotatorily mounted thereon by a pin 54 passing across a hole in lever 50 a clamp 56 having threadedly mounted therein the thread end of a vertical rod 57 ending at its lower end in a hook bolt 58, said rod 57 being slidably mounted through a vertical tube 59 formed or arranged within a counterbalanced float 60 which when the tank 1 is filled with water remains almost completely submerged in the tank water 13.

In addition to the valve 6 and the mechanism for operating same, the tank 1 is provided with a water inlet tube 61 ending on top in a water supply faucet 62 which is actuated by a float 63 through a rod 64 and connecting links 65 and 66 pivotally connected on two supporting arms 67 and 68.

The operation of the valve 6 and the mechanism for operating same is as follows: Assuming the valve 6 resting on its seat 3, as shown in Fig. 1, for operating same the handle 27 is rotated from its normal horizontal position (Fig. 1) downwards at a 90° angle to the vertical position indicated in Fig. 3 of the drawings. In this operation, as the shaft 26 rotates along with the handle 27, it causes the rotation of the axle-box 45 carrying the tooth 47 which presses down the arm 40 of the two-opposed-arm stop piece thereby causing the latter to rotate on the shaft 26 from its horizontal position as indicated by full lines in Fig. 7 and held downwards by the top stop 37 of the supporting bar 20 to the vertical position indicated by dotted lines in Fig. 7 and which is prevented from further rotation by the other stop 37' secured to the same bar of support 20, whereupon the roller 42 pushes down the flattened arm 33' of the lever 33 to thereby raise its opposed end connected with the chain 36, whereby the chain 35 will pull the valve 6 up from its seat 3 to the raised position indicated in Fig. 3 of the drawings, whereupon the discharge of water 13 from the tank 1 takes place through the larger openings of the guide sleeve 11 of the same and of the valve 6. The weight 53 always holds the rod 57 in its uppermost position whatever the position of float 60 may be on rod 57, and for this reason the water 13 in tank 1 continues discharging without necessity of the user holding the handle 27. As the float 60 descends, a time comes when its bottom contacts the hook-bolt 58 of the rod 57, which descends into contact with the bottom of tank 1. In this position the rod 57 swings downwardly the lever 50 until it remains in inclined position as locked by the long pin 39 projecting backwards from the supporting bar 20. In this downward inclining movement of the lever 50 the gripper 52 has moved onward and abutted the long pin 44 of the piece having opposed arms 40 and 41, and has caused said stop piece 40—41 to again rotate in a contrary direction to thereby cause it to move from its vertical position as indicated by the dotted lines in Fig. 7 to its normal horizontal position as indicated by full lines in Fig. 6, whereupon the roller 42 has discontinued pressing the flattened arm 33' of lever 33 and the latter's longer arm is forced to descend by the weight of the valve 6 which will fall on its seat 3' to obturate the water discharge, at the same time that the descent of the float 63 and its attached mechanism will operate the faucet 62 to allow the admission of water into the tank 1.

The features of this mechanism reside in the two stop pieces, namely piece 45 carrying the tooth 47, which only actuates when the handle 27 is rotated from its normal horizontal position to its vertical fallen position to cause the 90° angle rotation of the other stop piece having two opposed arms 40—41, which presses down the horizontally flattened arms 33' of the lever 33 and pulls up the longer arm thereof to thereby pull the chain 35 and raise the valve 6, and the other stop lever 50 having a gripper 52 and being connected at the end of its longer arm with the rod 57 slidably carrying the counterbalanced float 60 which descends by itself as the level of the water in tank 1 descends and when it reaches its lowermost position it causes the lever 50 to incline downwards and its gripper 52 to abut the longer pin 44 causing said two arm piece 40—41 to move back to its normal horizontal position to thereby release the lever 33 whereupon the valve 6 will fall, thereby again obturating the water discharge and allowing tank 1 to be refilled with water.

What I claim is:

1. A watercloset tank valve which is metallic and of hollow cylindrical shape open on top and closed at its bottom and having large openings at its peripheral wall, in combination with a vertical sleeve provided with large openings and having the valve slidably mounted therein, a stand integral with the valve seat formed at the top end of the discharge tube fixed across an opening in the tank bottom, a horizontal supporting bar connected with the top end of the stand and having a journal bearing formed at its opposed end, a horizontal shaft supported on the uppermost portion of the fore wall of the tank in said journal bearing and across an opening in the fore wall of the tank, a handle fixed at the outer end of said shaft, a lever pivotally mounted on a pivot pin projecting backwards from the supporting bar and having a horizontally flattened arm situated beneath said shaft and having the end of its opposed arm connected through a chain to the valve bottom, stop means pivotally mounted on said shaft so that by operating the handle said means will press down the flattened arm of said lever and raise the arm connected to the valve chain to pull the valve upwards from its seat thereby alowing the discharge of the tank water through the openings in the sleeve and the valve, and a counterbalanced float slidably mounted on a vertical rod carrying a stop at its lower end, a lever pivotally mounted on said horizontal shaft and having at one end a weight and at the other end connected with the top end of said rod, the latter lever being positioned transversely of said shaft behind said stop means, the latter lever carrying a raised stop gripper so that as the float approaches its lowermost position due to the level descent of the water in the tank the stop gripper of said lastly mentioned lever actuates upon said stop means and the latter release the flattened arm of the firstly mentioned lever allowing the fall of the other end of said lever connected to the valve chain and allowing the valve to seat on its seat to thereby obturate the discharge of water from the tank.

2. A watercloset tank valve as claimed in claim 1, in which the stop means comprises a member fixedly mounted on said shaft in the vertical plane of said lever and carrying a right angle tooth facing the fore wall of said tank, a stop piece having two opposed arms rotatably mounted on said shaft in a vertical plane parallel to that of said lever and having at the end of one arm a roller and at the end of the oposed arm a long horizontal stop pin so that as the handle is operated the right angle tooth will cause a 90° angle rotation of the two opposed arms of the stop piece and will cause the roller to press down the flattened arm of said lever and raise the arm of said lever to the valve chain.

3. A watercloset tank valve which is metallic and of hollow cylindrical shape and open on top and closed at its bottom and provided with large openings at its peripheral wall, in combination with a vertical sleeve provided also with large openings and having the valve slidably mounted therein, a stand integral with the valve seat formed at the top end of the discharge tube secured across the tank bottom, a horizontal supporting bar connected with the top end of the stand and having formed at its opposed end a journal bearing, a horizontal shaft supported on the uppermost portion of the fore wall of the tank in said journal bearing and to the outer end of which is secured the operating handle for the mechanism, a lever pivotally mounted on a pivot pin fixed to said supporting bar and having a horizontally flattened arm arranged beneath said shaft and having the end of its opposed arm connected by a chain to the valve bottom, stop means pivotally mounted on said shaft so that as the handle is operated said means will press down the flattened arm of said lever and will raise the arm connected to the valve chain to pull the valve up from its seat to thereby allow the discharge of water from the tank through the openings of the sleeve and the valve, and a counter balanced float and releasing mechanism cooperable with said shaft to operate said stop means and release the flattened arm of said lever whereby its opposed arm falls and permits the valve to obturate the discharge of water from the tank.

References Cited in the file of this patent
UNITED STATES PATENTS

| | | |
|---|---|---|
| 1,586,655 | Cook | June 1, 1926 |
| 2,328,701 | Woodrum | Sept. 7, 1943 |
| 2,645,780 | Becker | July 21, 1953 |
| 2,674,744 | White | Apr. 13, 1954 |